United States Patent [19]

Smith

[11] 4,325,679
[45] Apr. 20, 1982

[54] OIL PUMP FOR HERMETIC COMPRESSOR

[75] Inventor: Roger W. Smith, Grove City, Ohio

[73] Assignee: White Consolidated Industries, Inc., Clevleand, Ohio

[21] Appl. No.: 171,195

[22] Filed: Jul. 22, 1980

[51] Int. Cl.³ .............................................. F04B 39/02
[52] U.S. Cl. .................................... 417/372; 417/902
[58] Field of Search ....................... 417/368, 372, 902; 184/6.18, 6.28, 26; 415/90, 92

[56] References Cited

U.S. PATENT DOCUMENTS

| | | | |
|---|---|---|---|
| 3,008,629 | 11/1961 | Gerteis | 417/902 |
| 3,182,901 | 5/1965 | Solomon | 417/372 |
| 3,736,076 | 5/1973 | Ayling | 417/372 |
| 4,131,396 | 12/1978 | Privon et al. | 417/372 |

Primary Examiner—Richard E. Gluck
Assistant Examiner—Donald A. Kearney
Attorney, Agent, or Firm—Pearne, Gordon, Sessions, McCoy & Granger

[57] ABSTRACT

A hermetic refrigeration compressor has a two-stage oil pump in the vertically aligned crankshaft that is journaled in a combination thrust and radial bearing at the bottom of the crankshaft. The oil passes upward through an axial passage in the crankshaft and then outward through a radial passage which comprises the first stage of the pump. The oil then passes through a wide and shallow groove around most of the periphery of the crankshaft and is then returned through a second radial passage to another vertical passage offset from the axis of the crankshaft to move the oil upward to lubricate the various moving parts of the compressor.

6 Claims, 3 Drawing Figures

OIL PUMP FOR HERMETIC COMPRESSOR

BACKGROUND OF THE INVENTION

This invention relates generally to hermetic, sealed refrigeration compressors, and more particularly to an oil pumping system for lubricating the internal moving parts of such a compressor.

Hermetic refrigeration compressors have a sealed metal casing to which are directly connected the refrigerant outlet and return lines and the pumping mechanism must be located completely within the sealed casing. A conventional construction for such a compressor consists of a motor and reciprocating piston-type pump mounted as a unit on springs within the casing and generally arranged so that the motor is connected directly to the crankshaft for reciprocating the piston and arranged in a vertical orientation with the motor portion at the bottom and the cylinder housing containing the piston at the upper end. The bottom of the casing is filled with a quantity of lubricating oil and a pumping arrangement is used generally including internal passages in the crankshaft for forcing that oil upward to lubricate the various bearings and the crankpin and connecting rod to give a positive flow of oil under all conditions.

Normally, such compressors use two-pole motors, and therefore run at a relatively high speed of a nominal 3600 r.p.m. At this speed, it is possible to rely on centrifugal force within the crankshaft to provide the pumping action to force the oil upwards through the internal passages in the crankshaft and outward to the various bearings requiring lubrication. This centrifugal force can be employed in a number of ways, and may merely use a vertical eccentric passage in the crankshaft whose lower end is immersed below the upper surface of the oil. As the crankshaft rotates, the fact that the passage is eccentric exerts a force on the oil, tending to create a pressure within the passage which results in upward movement of the oil.

A problem arises, however, when compressors are operated at a lower speed, such as when they are driven by a four-pole motor where the nominal speed is therefore only 1800 r.p.m. In such cases, the centrifugal force may not be sufficient to maintain an adequate flow of oil to the uppermost bearings and various arrangements have been employed to augment the oil flow in addition to the pumping action provided by centrifugal force. One such example is shown in U.S. Pat. No. 3,182,901, where the crankshaft has a horizontal slot at the bottom designed to allow centrifugal force to force the oil radially outward with respect to the axis of the crankshaft to the crankshaft external surface. A helical passage is then provided around the outside of the crankshaft and the oil passes up this helical passage to another opening where it passes inside the crankshaft to a vertical, offset passage which conducts the oil to the upper parts of the compressor. Thus, the centrifugal force is augmented by the lifting force of the helical screw threadlike passage to increase the oil flow above what would have been available merely from centrifugal force. However, such constructions require relatively expensive machining of the helical passage and the amount of assistance provided by the helical passage can vary considerably, depending upon the temperature at which the compressor is operating, and hence the viscosity of the oil.

SUMMARY OF THE INVENTION

The present invention provides an improved oil pumping arrangement for the crankshaft of a hermetic compressor in which the viscous drag of the oil between two moving surfaces is used to augment centrifugal force to provide an improved pumping action when compressors are used at a lower speed, such as encountered when using a four-pole motor to drive the compressor.

According to a preferred embodiment of the present invention, the motor compressor assembly has a vertically mounted crankshaft which, at its lower end, is journaled in a combined radial and thrust bearing secured to the motor compressor frame. Generally, most or all of this lower bearing arrangement is below the level of the oil, and the bottom or thrust surface of the bearing includes an opening aligned with the axis of rotation of the crankshaft. The crankshaft has an axial passage extending at least partially up the crankshaft to include a radial vent passage above the oil level and oil enters this passage through the central opening. Partially up this axial passage and in line with the cylindrical portion of the bearing and below the upper level of the oil is a first radial passage extending from the axial passage out to the outer periphery of the crankshaft. The outer surface of the crankshaft has an annular type groove which extends around a major portion of the periphery in a direction opposite the direction of rotation of the crankshaft from the radial passage. The oil passes along this groove, which is made to be relatively wide and quite shallow, and the friction between the flat surface of the groove and the bearing surface causes a viscous drag of friction which adds to the force and pressure of the oil in the groove. The oil passes through the large portion of the periphery, of up to, for example, 300 degrees, where it exits inwardly through another radial passage to a vertically extending oil passage, which is offset from the axis of the crankshaft. Because of this offset, the force required to force the oil inward is much less than the centrifugal force required from the axis to the outer surface, and there still remains a force or pressure on the oil from the centrifugal force that has been augmented by the viscous draft to force the oil up the offset passage to lubricate the bearings at the top. The annular groove is interrupted by a solid wall portion between the two passages so that the oil is positively constrained within the annular groove between the two radial passages.

DESCRIPTION OF THE PREFERRED EMBODIMENT

Figure 1:
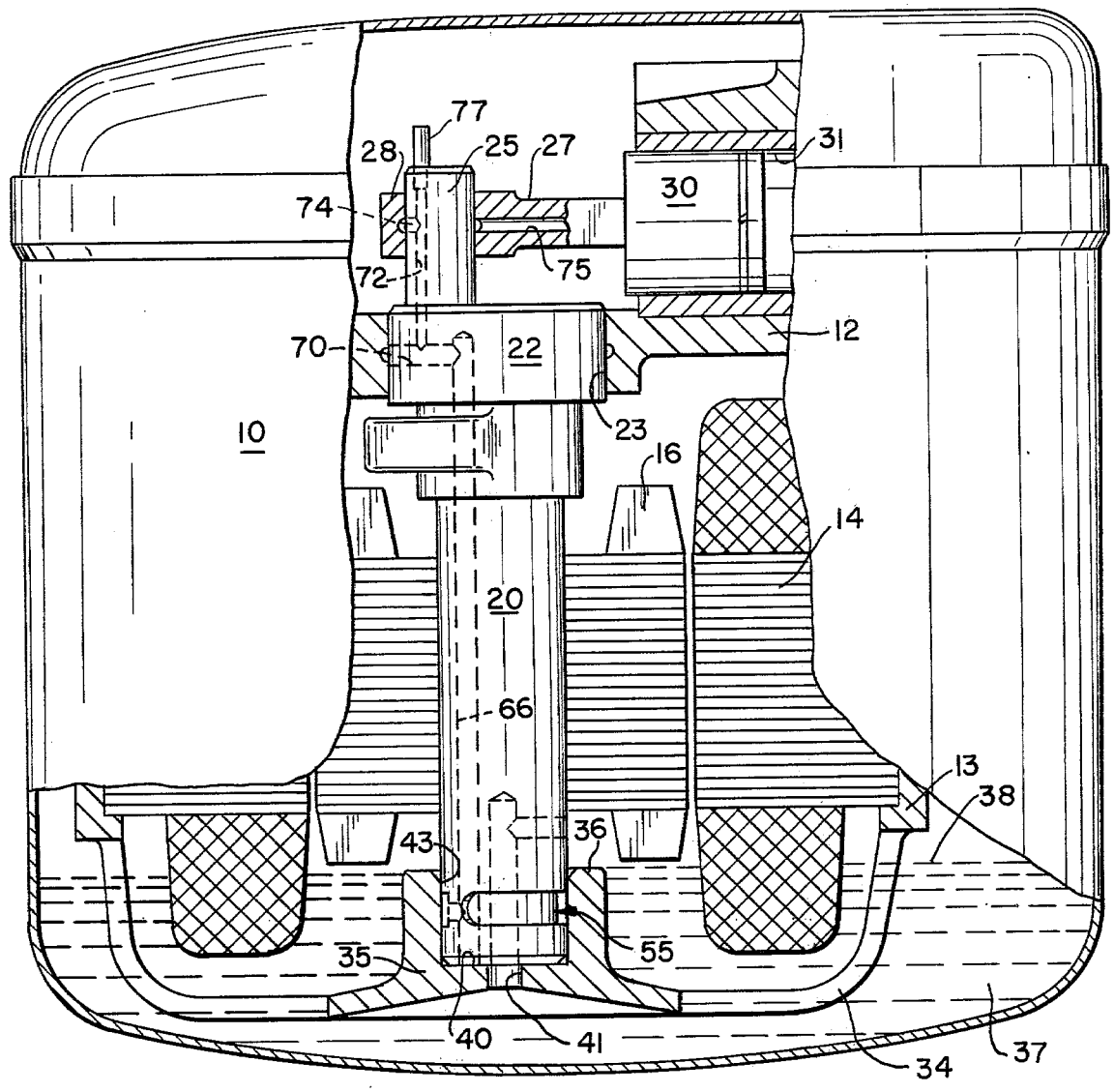
FIG. 1 is an elevational view of a hermetic compressor, partially in section and partially broken away, showing the preferred embodiment of the present invention.

Referring now to the drawings in greater detail, FIG. 1 shows a typical hermetic refrigeration compressor of the single cylinder type using a vertically mounted motor and crankshaft assembly for rotation about a vertical axis when the compressor is installed in the appliance. The compressor includes the sealed casing 10, within which is mounted the motor compressor unit in a suitable manner, such as by springs (not shown). The motor compressor includes a cylinder housing 12 and a motor housing 13 which carries the motor stator 14. Within the stator 14 is a rotor 16 carried on a crankshaft 16 journaled at its upper and lower ends for rotation about a vertical axis. For this purpose, above the rotor 16, the crankshaft 20 has an enlarged journal portion 22 rotatably mounted in a bearing portion 23 formed directly on the cylinder housing 12. A crankpin 25 extends vertically above the journal portion 22, and receives the bearing portion 28 of a connecting rod 27. The connecting rod 27, in turn, is mounted by suitable means, such as a wrist pin (not shown), to a piston 30 carried within a cylinder 31. As the crankshaft 20 is rotated by the electric motor provided by the stator 14 and rotor 16, the crank pin 25, acting through connecting rod 27, causes the piston 30 to reciprocate in cylinder 31 to provide the usual pumping action through inlet and discharge valves in the well-known manner. This structure has been described as background for purposes of illustration only, since the present invention is directed to the oil pumping surface in the lower end of the crankshaft 20 for lubricating the moving parts.

At its lower end, the motor housing 13 carries a spider 34 which supports a central hub 35, which provides the lower bearing for the crankshaft 20. The hub 35 has a top surface 36 adjacent the rotor 16, and the lower portion of the casing 10 is filled with a suitable amount of lubricating oil, indicated at 37, and this oil forms a reservoir in the lower portion of the casing and has an upper surface or level 38 which may be close to, but preferably slightly below, the top surface 36 of hub 35.

Hub 35 is provided with a cylindrical recess having a thrust bearing surface 40 normal to the axis of the crankshaft 20 in which is located a central opening 41 passing through the hub 35 to communicate oil from the reservoir to the thrust surface 40. The hub 35 also includes a cylindrical bearing portion 43 extending upward from the thrust surface 40 to radially position the crankshaft. Crankshaft 20 includes an end or thrust surface 45 resting in bearing contact with the thrust surface 40 of the hub to axially position the crankshaft and provide a rotating thrust bearing to support the weight of the rotating parts. The crankshaft also includes a cylindrical journal portion 47 which makes a bearing clearance fit with the cylindrical bearing portion 43 on hub 35 to radially position the lower end of the crankshaft and cooperate with the upper bearing portion 28 to provide two spaced radial bearings for the crankshaft.

The oil pumping and circulation arrangement is carried in the lower end of the crankshaft 20 and includes an axial bore 51 extending upward a short distance in the crankshaft and in substantial alignment with the central opening 41 and thrust surface 40. Thus, the oil in the reservoir is able to pass through the central opening 41 and up the axial bore 51 to substantially the same distance as the oil upper surface 38. The bore 51 extends above this upper surface and has a radial bleed passage 52 to permit any dissolved refrigerant gases in the oil to escape and ensure free passage of oil from the reservoir into the axial bore 51.

The first stage of pumping action is provided by a first radial passage 54 which extends radially outward from axial bore 51 to an annular groove 55 formed on the outer surface of the journal portion 47 of crankshaft 20 within the cylindrical bearing portion 43 of hub 35. The groove 55 is formed with an axially extending cylindrical bottom wall 57 having parallel upper and lower sidewalls 58 and 59, each lying in a plane normal to the crankshaft axis. It should be noted that this groove is relatively shallow, but fairly wide, to provide a maximum exposure of the oil in the groove to surfaces of both the rotating crankshaft 20 and the fixed bearing surface 43. Thus, as oil is forced outward into the groove 55 by centrifugal force through the first passage 54, it then is forced around the groove 55 in a direction opposite the rotation of the crankshaft (which rotates in a clockwise direction as shown in FIG. 3).

As stated, the groove 55 has one end in alignment with the first radial passage 54 and extends substantially the full distance around the outer periphery of the journal portion 47, but is interrupted at its other end by a wall portion 61 to prevent communication between the two ends of the groove. At the other end of the groove is a second radial passage 64 which extends radially inward to open into an offset vertical oil passage 66 extending parallel to but offset from the axis of the compressor upwards through the crankshaft. The oil passes upwards through passage 66 to the journal portion 22, where it exits through a radial passage 70 to provide lubrication to the bearing 23. The lower end of the vertical passage 66 is sealed off by a suitable plug 67 adjacent the thrust or end surface 45. A second vertical passage 72 extends upward within the crankpin 25 from the radial passage 70, and is also provided with a radial passage 74 to provide lubrication of the connecting rod bearing portion 28. It is also noted that the connecting rod 27 may include an axial passage 75 to lubricate the wrist pin (not shown). At its upper end, the vertical passage 72 may be partially closed off by a bleed tube 77, which may serve in part to control oil flow by limiting the amount of oil forced out the upper end, and also serves to aid in lubrication by spraying oil around the interior of the casing.

Figure 2:
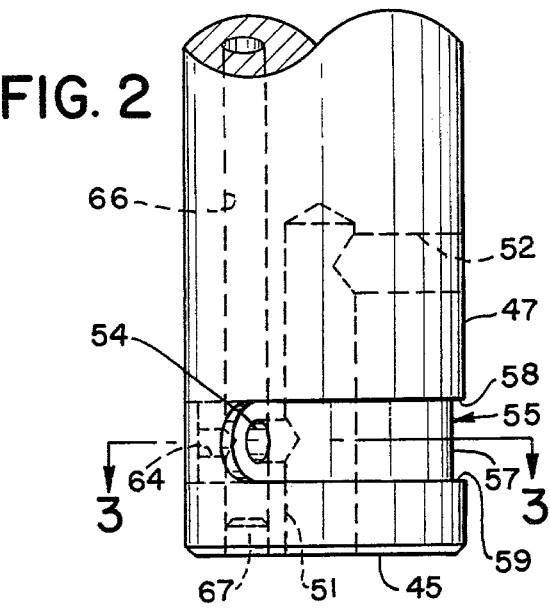
FIG. 2 is an enlarged, fragmentary view of the lower portion of the crankshaft shown in FIG. 1.
Figure 3:
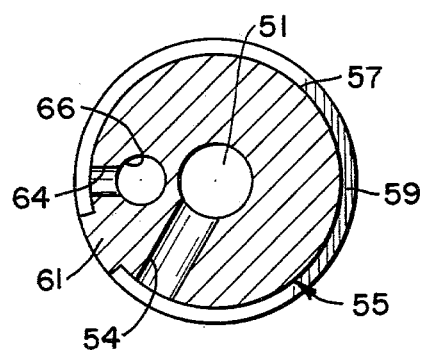
FIG. 3 is a cross-sectional view, taken on line 3—3 of FIG. 2, showing the crankshaft passages.

As can be seen most clearly in FIGS. 2 and 3, the first and second radial passages 54 and 64 have the same axial spacing along the axis of crankshaft 20, so that the passage of oil around the groove 55 results not only from the force in the first radial passage 54 from centrifugal force as the crankshaft rotates, but also is augmented because of the relative movement between the groove bottom wall 57 and the cylindrical bearing surface 43. Because the groove 55 is quite shallow but also quite wide, there is a maximum of viscous force applied to the oil because of the relative movement of the two surfaces and it is contemplated that in the preferred embodiment, the groove may have a width of four to eight times its depth to get the maximum amount of pumping action from the viscous forces on the oil. Since the second radial passage 64 is much shorter than the first radial passage 54, because of the offset of the vertical passage 66, there is some loss in pressure because the oil is forced radially inward, but this loss is much less than the centrifugal force provided by the first passage because of the shorter length. Thus, the oil that flows upward in the offset passage 66 flows under a pressure created not only by the centrifugal force in the first passage 54 minus the lost centrifugal force in the second passage 66, but is also substantially augmented by the viscous forces provided by the flow of the oil around the groove 55. It is desirable to have this peripheral flow of the oil in the grooves 55 as long as possible, so that the wall portion 61 separating the grooves is made generally as short as possible. It has been found that the actual length of flow as determined by the axis position of the first and second radial passages 54 and 64 may be as much as 300 degrees around the periphery of the crankshaft without causing interference between the radial and axial passages and permitting easy machining of all of these portions of the crankshaft. Of course, shortening the peripheral length of the groove 55 to an extent less than 300 degrees would decrease the amount of pumping action provided by the groove, as would deepening the groove as compared to its width for the same cross-sectional area, which, must remain substantially low as compared to the diameter of the other passages so as not to provide an overall flow restriction in this area. Furthermore, it has been found with a groove 55 having a depth substantially less than the width so as to provide a maximum area of contact between the moving walls, good pumping action is provided over a wide range of viscosities of the lubricating oil between the higher viscosity prevailing when the compressor is starting and the lower viscosity because of the higher temperature that occurs when the compressor has been operating under load for a period of time.

Although the preferred embodiment of this invention has been shown and described, it should be understood that various modifications and rearrangements may be resorted to without departing from the scope of the invention as defined in the claims.

What is claimed is:

1. A hermetic refrigeration compressor comprising a case, a motor compressor unit inside said case and a body of lubricating oil in the bottom of said case defining an upper surface, said unit including a motor having a crankshaft rotatable about a vertical axis, said unit including a bearing member at the lower end of said crankshaft below said oil upper surface, said bearing member including a thrust surface normal to said axis, said crankshaft having an end surface engaging said thrust surface, said bearing member having a cylindrical surface extending upward from said thrust surface coaxially with said vertical axis, said crankshaft having a cylindrical journal surface in close bearing contact with said bearing cylindrical surface, said bearing member having a vertical axially positioned bore to conduct oil to said crankshaft end surface, said crankshaft having an axial bore in communication with said bearing member bore, said crankshaft having a first radial passage communicating at its inner end with said vertical axial bore and at its outer end with said crankshaft cylindrical bearing surface, said crankshaft cylindrical bearing surface having a partial annular groove extending from said first radial passage in a direction opposite the direction of rotation of said crankshaft partially around said cylindrical bearing surface, the opposite ends of said annular groove being spaced apart by a portion of said crankshaft cylindrical bearing surface, said crankshaft having a second bore therein parallel to the said axis and spaced therefrom to communicate with the upper end of said crankshaft, said crankshaft having a second radial bore extending from the other end of said annular groove away from said first radial bore and communicating at its inner end to said second crankshaft bore, said second radial passage having a shorter length than said first radial passage, whereby oil entering said first axial bore passes upward and radially outward through said first radial passage to said partial annular groove to produce a first stage pumping as a result of centrifugal force, said oil passing around said annular groove whereby the friction between said annular groove and said bearing cylindrical surface provides increased pumping force on said oil, said oil passing inward from said other end of said partial annular groove through said second radial passage to said second vertical bore and upward in said second bore to the upper portion of said crankshaft.

2. A hermetic refrigeration compressor as set forth in claim 1, wherein said first and second radial passages are spaced the same distance from said crankshaft end surface.

3. A hermetic refrigeration compressor as set forth in claim 2, wherein the length of the partial annular groove between said first and second radial passages is a major portion of the circumference of the crankshaft.

4. A hermetic refrigeration compressor as set forth in claim 1, wherein said partial annular groove has an axially extending cylindrical bottom surface.

5. A hermetic refrigeration compressor as set forth in claim 4, wherein said partial annular groove has sidewalls lying in planes normal to said vertical axis.

6. A hermetic refrigeration compressor as set forth in claim 5, wherein said partial annular groove has an axial width between said sidewalls at least four times the radial depth of the groove.

* * * * *